L. J. CAMPBELL.
CLUTCH.
APPLICATION FILED JULY 16, 1913.
1,125,646.
Patented Jan. 19, 1915.
2 SHEETS—SHEET 2.
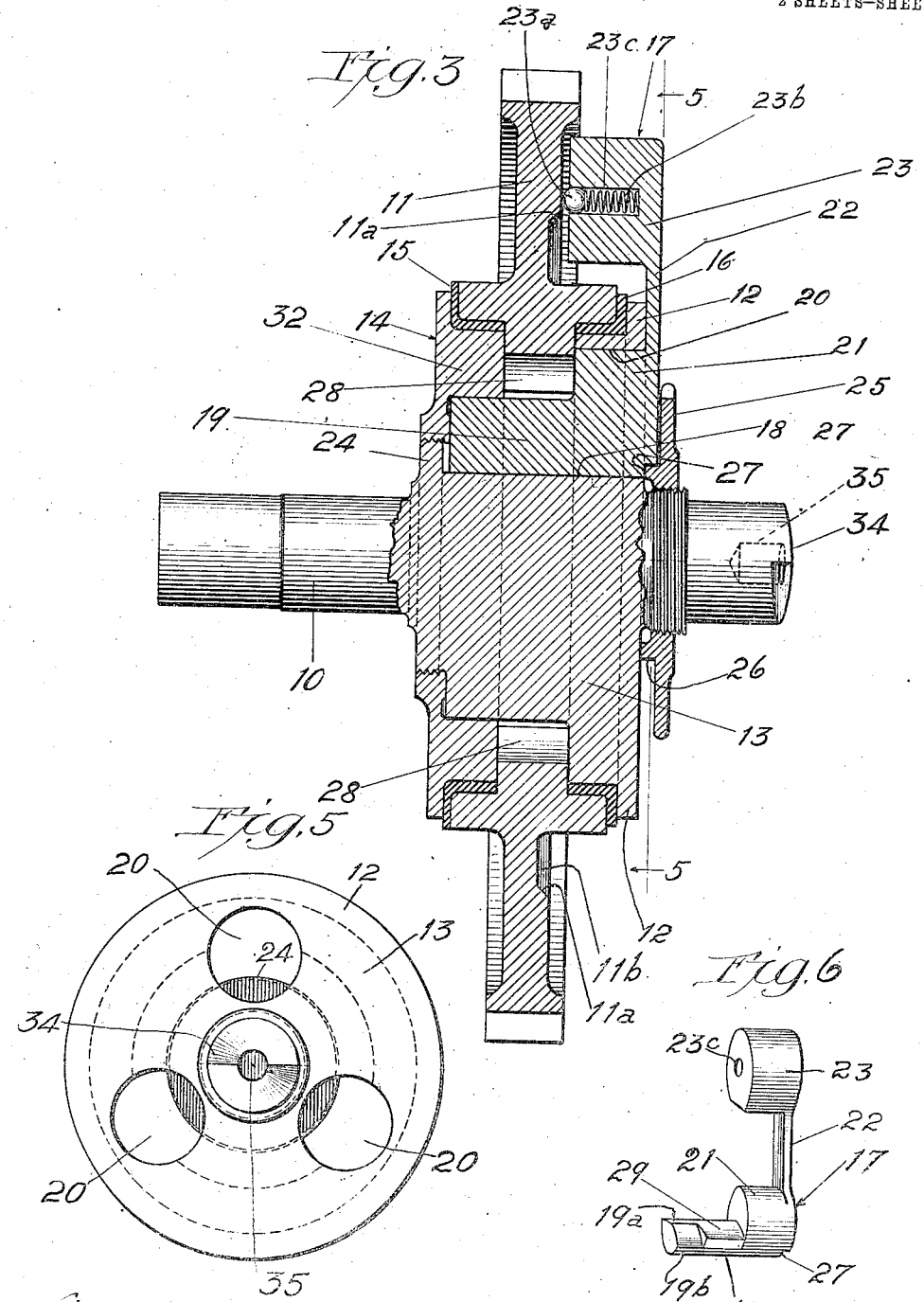
Witnesses:
Harry S. Gaither
Inventor:
Leon J. Campbell
by Poole & Cromer
Attys

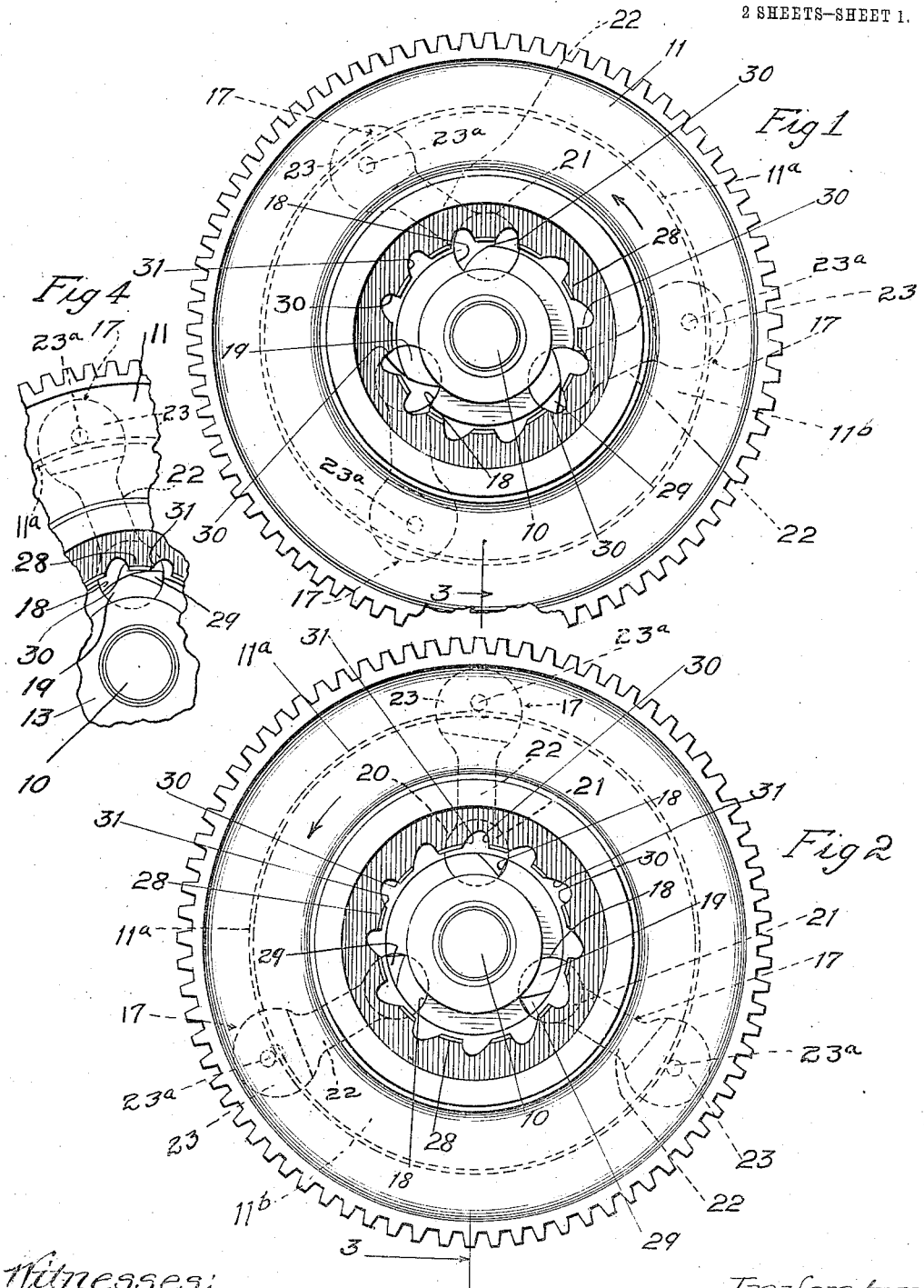

UNITED STATES PATENT OFFICE.

LEON J. CAMPBELL, OF CHICAGO, ILLINOIS, ASSIGNOR TO JAMES T. HEALY, TRUSTEE, OF CHICAGO, ILLINOIS.

CLUTCH.

1,125,646.  Specification of Letters Patent.  Patented Jan. 19, 1915.

Application filed July 16, 1913. Serial No. 779,249.

*To all whom it may concern:*

Be it known that I, LEON J. CAMPBELL, a citizen of the United States, and a resident of Chicago, in the county of Cook and State of Illinois, have invented certain new and useful Improvements in Clutches; and I do hereby declare that the following is a full, clear, and exact description thereof, reference being had to the accompanying drawings, and to the letters of reference marked thereon, which form a part of this specification.

This invention relates to a device in the nature of a clutch particularly adapted for use in connection with self starters for motor vehicles and the like. A clutch of the kind referred to is adapted, upon the operation of the motor of a self starter, to automatically connect the same with the engine of the motor vehicle, so that the latter may be started by the self starter motor, and said clutch is adapted to automatically disconnect the self starter motor from the engine of the motor vehicle, as soon as the vehicle engine starts under its own power and runs ahead of the self starter motor.

Among the objects of the invention is to provide improvements in the type of clutches referred to and in the several particulars as will hereinafter appear.

The invention consists in the matters hereinafter described and more particularly pointed out in the appended claims.

In the accompanying drawings—Figure 1 is a view in side elevation of a clutch device constructed in accordance with my invention with parts thereof being omitted for the sake of clearness of illustration; the clutch members or keys being shown as occupying locking positions; Fig. 2 is an elevational view similar to that of Fig. 1, the clutch members or keys being shown as occupying non-locking position; Fig. 3 is a sectional view on an enlarged scale, taken on line 3—3 of Fig. 2; Fig. 4 is a fragmentary side elevational view of parts of the clutch device, showing one of the clutch members or keys in position intermediate fully locked and non-locked positions; Fig. 5 is a fragmentary transverse sectional view on a small scale, taken on line 5—5 of Fig. 3, the shaft being shown in end elevation, the clutch members or keys being omitted for the sake of clearness of illustration; Fig. 6 is a perspective view of one of the clutch members or keys.

The clutch device forming the subject-matter of the present invention embraces, in its general features, the following parts: a shaft which may be the shaft of the engine of the motor vehicle or a shaft section having operative connection with the motor vehicle engine and adapted to rotate therewith; a rotative member mounted on said shaft and having operative connection with the motor of a self starter, so that said rotative member will be rotated upon the operation of said self starter motor; and a rocking clutch member, preferably in the form of a key, carried by said shaft and adapted when rocked in one direction to positively engage said rotative member and lock or connect the same with said shaft, so that upon the operation of the motor of the self starter the shaft will be rotated and the engine of the vehicle started. The rocking of said clutch member or key into locking position is automatic, taking place upon the operation of the self starter motor, and the said clutch member or key is maintained in locked position under the action of gravity thereon and as long as the self starter motor is connected with and rotating said shaft. The clutch member or key will, however, as soon as the vehicle engine starts under its own power and runs ahead or rotates at a greater rate of speed than the self starter motor, be automatically rocked in the other direction and become disengaged from said rotative member and disconnect the self starter motor from the shaft, so that the vehicle engine may under its own power run free of the self starter motor. The clutch member or key will, when rocked into non-locking position, frictionally engage the rotative member, and will be maintained, by reason of such frictional engagement, in non-locking position during the rotation of said shaft by the vehicle engine. As soon as the vehicle engine starts and runs under its own power, the self starter motor is stopped. When the vehicle engine is stopped and the shaft comes to rest, the clutch member or key being in frictional engagement with said rotative member will be in position to automatically assume locking position and connect the rotative member with the shaft upon the operation of the self starter motor, and the cycle of operations above enumerated will be repeated. The clutch member or key, when in locking position, will be maintained in such position by the action of gravity thereon, and when in non-locking position is maintained in such position by reason of frictional engagement with the rotative member. The rocking of the clutch member or key in either of its two positions is automatic.

Referring to the drawings, wherein one form of the device above referred to and as embodying my invention is shown in detail, the construction thereof is as follows: Loosely mounted on a shaft 10 is a rotative member 11, preferably in the form of a gear wheel. Said gear wheel or rotative member 11 has connection through the medium of a worm (not shown) with the motor of a self starter. The shaft 10, by preference, constitutes the shaft of the engine of the motor vehicle, but it of course may be a short shaft section adapted to accommodate said rotative member 11, and in which case said short shaft section will have operative connection with the shaft of the vehicle engine so as to rotate therewith. The rotative member 11 is prevented from lateral movement on said shaft 10 by means of an outwardly extending annular flange 12 formed on the enlarged annular portion 13 of said shaft and an annular collar or ring 14 having screw-threaded engagement with the shaft opposite said flange 12; said annular flange 12 and said ring being spaced apart laterally and between which said rotative member 11 is located and against which said member has bearing, as shown in Fig. 3 of the drawings. The rotative member 11 is preferably provided with annular bushings 15, 16, one on each side thereof, said bushings being adapted to bear on the flange 12 and the ring 14, respectively, as shown in said Fig. 3.

In order that the rotative member 11 may be locked to and unlocked from the shaft 10, clutch members, preferably in the form of rocking keys, 17, 17 are provided, the same together with their associated parts being constructed as follows: In that portion of the shaft 10 embraced by said rotative member 11, is provided a plurality of longitudinally extending concave or semicircular grooves or seats 18, 18, in which are adapted to rock or turn the substantially semicircular portions 19 of the clutch members or keys 17. Said grooves or seats 18, as shown in the drawings, are circumferentially spaced apart an equal distance, and register with relatively large circular openings or apertures 20 in the enlarged annular portion 13 of said shaft. (See Fig. 5.) As shown in the drawings, there are three of said grooves or key seats 18, and likewise three of said clutch members or keys 17, one clutch member or key in each groove or key seat. Each key 17 is provided with an enlarged circular portion 21 adapted to fit and turn in said apertures 20. The circular portion 21 of said clutch member or key 17 extends laterally beyond said aperture 20 and is provided with a radially extending arm 22, to the outer or free end of which is secured a weighted member 23. As shown in the drawings, said weighted member 23 is an integral part of the key, being formed by making an enlarged portion or head on the outer end of said arm 22. The end of the portion 19 of each key 17 opposite the arm 22 may abut against an outwardly extending annular flange 24 preferably made integral with the shaft 10 and upon which is threaded the retaining ring or collar 14, hereinbefore referred to. The same end of said portion 19 of each key also abuts against a portion of said ring 14, as shown in Fig. 3. Said annular flange 24 and said collar or ring 14 prevent endwise movement of the clutch member or key 17 in its seat 18 in one direction. Endwise movement of the said clutch member or key 17 in its seat in the opposite direction is prevented by an annular collar or ring 25 having screw-threaded engagement with the shaft 10 on the side of the key provided with the arm 22. Said collar or ring 25 is provided adjacent its bore with an inwardly extending annular rib 26 adapted to enter the outwardly facing channel in said key and to abut against the shoulder 27 formed by said channel. (See Figs. 3 and 6.) In assembling the device, the collar or ring 25 is removed from said shaft 10 and the keys 17 are placed in said key seats 18 by inserting the same through said circular apertures 20.

The rotary member 11 is provided in the bore thereof with a plurality of inwardly extending, circumferentially spaced locking shoulders 28. Each clutch member or key 17 is provided on the portion 19 thereof, extending across the space between said annular portion 13 and said ring 14, with a locking lug 29, adapted, when the key is rocked in its seat 18 in one direction, to project beyond the cylindrical surface of the shaft 10 and be in position to engage or come into contact with one of the faces or surfaces of one of said locking shoulders 28. The face or surface of the shoulder 28 with which said lug 29 is adapted to contact, namely, the face 30, is relatively flat and the locking shoulder 28 is so arranged that when the lug 29 extends beyond the shaft and is in contact with said face 30, the pressure coming on said lug 29 will act in a line oblique to a radial line passing through the axis of rotation of said key 17, and in a direction to press the opposite curved side of the portion 19 of said key against the concave surface of said key seat 18 with which said opposite curved side is in contact, consequently the pressure on the key 17 is of a nature tending to crush the same and not to shear or break off the locking lug 29. The pressure on the key is resisted by the shaft 10. The shoulder engaging face of said lug 29 is complementary to said contact face 30. So far as the arrangement of the locking shoulder 28 with regard to the contact face 30 thereof and the contact face of the lug 29 is concerned, this is the same as shown, described and claimed in my application, Serial No. 834,075, filed April 24, 1914, and therefore needs no further description in detail here. It might be added, however, in order to more clearly understand the arrangement of the locking shoulder 28 with respect to the contact face 30, that a straight line drawn through and parallel with the said face 30 in a direction toward the axis of rotation of said shaft 10, would pass at a point laterally spaced a distance radially from the central axis of rotation of said shaft 10. The face 31 of said shoulder 28 opposite the lug engaging face 30 is preferably curved, so that when the shaft 10 rotates faster than the rotative member 11, the inner edge of said face 31 will strike the adjacent inclined surface of said lug 29 and rock the key 17 in its seat in a direction to force the lug 29 into the key seat 18 and out of engagement with said face 30 of the shoulder 28. (See Fig. 4.) It follows that the rotary member 11, when the key is rocked as just stated, will be disconnected from the shaft 10 and the latter permitted to rotate relatively to the former.

In order that the keys or clutch members 17 when in non-locking position (see Figs. 2 and 3) may frictionally engage the rotative member 11 and be maintained or held in said non-locking position by such frictional engagement, each key is provided with a roller 23ᵃ adapted to be pressed or forced against the surface of the rotative member beyond an annular inclined surface 11ᵃ of said rotative member by a coiled spring 23ᵇ located in a pocket 23ᶜ provided therefor in the weighted member 23 of each key. (See Fig. 3.) The portion of the rotative member 11 inside of said inclined surface 11ᵃ is recessed or cut away to provide an annular laterally opening channel 11ᵇ so that when the keys are rocked in locking position (see Fig. 1), the rollers 23ᵃ then being opposite said channel 11ᵇ will not engage said rotative member.

The device herein described and shown operates as follows: When the several parts of the device are at rest, and the clutch members or keys 17 are in the position shown in Fig. 2, the locking lugs 29 of said keys are all in the key seats 18 and out of engagement with the locking shoulders 28. In this position of the keys the lugs 29 do not project beyond the shaft 10 and the rotative member 11 is disconnected from said shaft. In this position of the keys 17, however, the rollers 23ᵃ carried by said keys 17 are pressed, by means of the springs 23ᵇ against the surface of the rotative member 11 beyond the annular inclined surface 11ᵃ of said rotative member. (See Fig. 3.) Said rollers 23ᵃ frictionally engaging said rotative member 11 serve to maintain or hold the keys in non-locking position. The axis of rotation of the keys 17 is spaced radially outward from the axis of rotation of the rotative member 11, the axis of rotation of the latter coincides with the axis of rotation of the shaft 10. By reason of the fact that the axis of rotation of the keys is spaced from the axis of rotation of the rotative member, as just stated, the arc in which the weighted upper end of each of said keys 17 moves crosses the annular inclined surface 11ᵃ. By reason of this fact, and by reason of the fact that the keys 17 are held in non-locking position by frictional engagement of the keys with the rotative member 11, the upper ends of the keys, when the rotative member is rotated by the motor of the self starter, will be carried therewith until the rollers 23ᵃ cross the annular inclined surface 11ᵃ. The shaft 10 during the movement of the upper ends of the keys 17 remains stationary. As soon as the rollers 23ᵃ pass over the annular inclined surface 11ᵃ and come opposite the annular channel 11ᵇ, said rollers 23ᵃ will be out of engagement with the rotative member and the weighted ends of those keys which are above a horizontal plane passing through the axis of rotation of the parts are free to fall and effect the rocking of the keys in a direction to cause the lugs 29 to project beyond the shaft, engage one of the locking shoulders 28 and lock the rotative member to said shaft. The action of gravity on the weighted members 23 after the same are free plays an important part in effecting the rocking of said keys into locking position. The rotative member 11 is now connected with the shaft 10 and the motor of the self starter rotates the same to start the engine of the motor vehicle. The weighted members 23 being free, under their weight and acted upon by gravity, maintain the keys 17 in locking position as long as the self starter motor is driving the shaft 10. In the passing of the rollers 23ᵃ across the inclined surface 11ᵃ an impetus is given to the keys whereby the rocking thereof is accelerated. As soon, however, as the vehicle engine starts under its own power and the shaft 10 runs ahead of the rotative member or gear wheel 11, the clutch members or keys 17 are carried with said shaft and the lugs 29 will be moved out of contact with the face 30 of the locking shoulder 28. (See Fig. 4.) The inclined surfaces of said lugs 29 will come into contact with the inner edge of the face 31 of the next adjacent shoulder 28, (see Fig. 4) with the result that said keys will be rocked or turned in their seats 18 in a direction to force the locking lugs 29 into the key seats and within the circumferential surface of said shaft 10. Consequently, the rotative member 11 is disconnected from said shaft 10. In disconnecting the keys from the rotative member, said keys are rocked until the rollers 23ª thereof come into engagement with the rotative member beyond the annular inclined surface 11ª thereof. Said rollers 23ª being forced by the springs 23ᵇ against the rotative member 11, frictionally engage the same, and such frictional engagement, aided by centrifugal force, serves to hold or maintain said lugs 29 out of connection with said locking shoulders 28. This position of the keys or clutch members 17 is shown in Fig. 2 and is non-locking position. As soon as the vehicle engine starts under its own power and the shaft 10 runs ahead of the rotative member or gear wheel 11, the self starter motor is stopped and the rotative member remains stationary. The rollers 23ª rotate on the now stationary rotative member.

To limit the rocking or turning movement of the keys 17 in either direction, so that the lugs 29 will not project beyond the shaft 10 a greater distance than required when the keys have been rocked into locking position, and to prevent the edge of the portion 19 opposite the lugs 29 of the keys from projecting beyond the shaft when the keys are rocked into unlocking position, the annular retaining member or ring 14 hereinbefore referred to is provided with an inwardly extending annular flange 32 adapted to overlap the adjacent part of the portion 19 of the keys and against the bore of said flange 32 either one of the relatively flat faces 19ª, 19ᵇ of said portion 19 is adapted to come in contact in turning or rocking the key. (See Figs. 3 and 6.)

By reason of the fact that the several clutch members or keys 17 have frictional engagement with the rotative member or gear wheel 11, when said keys are in non-locking position (see Fig. 2), the lugs 29 will be maintained out of locking engagement with the rotative member 11 as long as the shaft 10 is being rotated by the vehicle engine. The said keys are held in non-locking position no matter at what rate of speed the shaft 10 is rotated by the vehicle engine. When the shaft 10 is rotated by the vehicle engine and at a rate of speed, say between one hundred (100) and one hundred and fifty (150) revolutions per minute, the centrifugal force provided acting on said weighted keys 17, in addition to the frictional engagement of the key with the rotative member, serves to maintain the key in non-locking position. In case the speed of the vehicle engine runs as low as seventy-five revolutions per minute, not enough centrifugal force is produced to have any effect upon the keys 17, but the frictional engagement between the keys and the rotative member is sufficient to maintain the keys in non-locking position.

The operation of the keys 17 is automatic and will effect the connection of the rotative member 11 with the shaft 10 upon the operation of the self starter motor, and will effect the disconnection of the rotative member and the shaft as soon as the shaft runs ahead of the rotative member.

In order that the vehicle engine may be cranked manually, the end of the shaft 10 adjacent the retaining ring 25 is provided with clutch teeth 34 adapted to be engaged by similar teeth on a crank handle (not shown) adapted to be applied to the end of said shaft. (See Fig. 3.) As shown in dotted lines in Fig. 3, the end of said shaft 10 in addition to the provision of clutch teeth 34 is provided with a centrally disposed, outwardly opening aperture or hole 35 into which is adapted to be inserted the centering pin of the crank handle.

It is to be understood that the details of construction in the clutch device illustrated may be changed or variously modified without departure from the spirit of my invention, and I do not wish to be limited to the exact details of construction and arrangement shown, except as pointed out in the appended claims.

I claim as my invention:

1. In a device of the character described, in combination with a shaft member, a rotative member mounted on said shaft member, a rocking key adapted when rocked in one direction to connect the rotative member with said shaft member and when rocked in the other direction to disconnect the rotative member from said shaft member, and coacting means on said key and one of said members for holding the key in its unlocked position, during the rotation of one of said members relatively to the other member.

2. In a device of the character described, in combination with a shaft member, a rotative member mounted on said shaft member, a rocking key mounted on one of said members and provided with a locking lug, the other of said members being provided with a locking shoulder adapted to be engaged by said lug, said key adapted when rocked in one direction to effect the engagement of said lug with said shoulder and connect the rotative member with said shaft member and when rocked in the other direction to effect the disengagement of said lug and shoulder and disconnect the rotative member from said shaft member, and coacting means on said key and one of said members for holding the key in its unlocked position, during the rotation of one of said members relatively to the other member.

3. In a device of the character described, in combination with a shaft member, a rotative member mounted on said shaft member, a rocking key adapted when rocked in one direction to effect the connection of said rotative member with said shaft member and when rocked in the other direction to effect the disconnection of said rotative member from said shaft member, coacting means on said key and one of said members adapted to effect the rocking of said key in the direction to effect the disconnection of said rotative member from said shaft member, and means affording frictional engagement of said key with one of said members when the key is in unlocked position.

4. In a device of the character described, in combination with a shaft, a rotative member mounted on said shaft and provided with a locking shoulder, a rocking key carried by said shaft and provided with a lug adapted to engage said shoulder, a weighted member connected with said key, and means affording frictional engagement of said key with said rotative member when said key is in unlocked position.

5. In a device of the character described, in combination with a shaft, a rotative member mounted on said shaft, a plurality of rocking keys carried by said shaft and adapted, when rocked in one direction, to engage the rotative member and connect the same with said shaft, and said keys, when rocked in the other direction, to become disengaged from said rotative member and disconnect the same from said shaft, and each key being adapted when in one position to frictionally engage said rotative member.

6. In a device of the character described, in combination with a shaft member and a rotative member, the latter being mounted on the former, a rocking key carried by one of said members and adapted when rocked in one direction to effect the connection of said rotative and shaft members and when rocked in the other direction to effect the disconnection of said rotative and shaft members, and means affording frictional engagement of said key with one of said members when said key is in non-locking position.

7. In a device of the character described, in combination with a shaft, a rotative member mounted on said shaft and provided with a locking shoulder, a rocking key carried by said shaft and provided with a lug adapted to engage said shoulder, said key being provided with an arm, and a weighted member mounted on said arm and provided with a yieldably mounted member adapted in one position of said key to frictionally engage said rotative member.

8. In a device of the character described, in combination with a shaft, a rotative member mounted on said shaft and provided with a locking shoulder, a rocking key carried by said shaft and provided with a lug adapted to engage said shoulder, and a weighted member secured to said key and provided with a yieldably mounted roller adapted in one position of said key to frictionally engage said rotative member.

9. In a device of the character described, in combination with a shaft, a rotative member mounted on said shaft and provided with an outwardly opening annular recess in one side thereof and a rocking key adapted when rocked in one direction to contact said rotative member with said shaft and when rocked in the other direction to disconnect said rotative member from said shaft, said key being provided with a member adapted when said key is in unlocked position to engage the portion of said rotative member beyond said annular recess and when said key is in locked position to be opposite said recess and be out of contact with said rotative member.

10. In a device of the character described, in combination with a pair of clutch members mounted in rotatable relation to each other, and a rocking key adapted to be moved into and out of positive locking engagement with said clutch members and having a frictional surface portion adapted to be frictionally engaged by one of said clutch members when the key is out of locking position, and moved by the latter toward locking position.

11. In a device of the character described, in combination with a shaft, a rotative member mounted on said shaft and provided with an outwardly opening recess in one side thereof, a rocking key carried by said shaft and adapted when rocked in one direction to connect said rotative member with said shaft and when rocked in the other direction to disconnect the rotative member from said shaft, said key being provided with a yieldingly mounted member adapted in one position of said key to frictionally engage the portion of the rotative member beyond said recess and in the other position of said key to be opposite said recess and to be out of contact with said rotative member.

12. In a device of the character described, in combination with a shaft, a rotative member mounted on said shaft and provided with a laterally facing annular inclined surface on one side thereof, a rocking key adapted when rocked in one direction to effect the connection of the rotative member with said shaft and when rocked in the opposite direction to effect the disconnection of said rotative member from said shaft, and a yieldingly mounted member mounted on said key and adapted to contact with and ride over said inclined surface in the rocking of said key in either direction.

In testimony, that I claim the foregoing as my invention I affix my signature in the presence of two witnesses, this 10th day of July A. D. 1913.

LEON J. CAMPBELL.

Witnesses:
  EUGENE C. WANN,
  MAURICE D. HERMAN.